US010743529B2

(12) United States Patent
Cavanaugh et al.

(10) Patent No.: US 10,743,529 B2
(45) Date of Patent: Aug. 18, 2020

(54) METHOD TO USE A COLORED PHOTOLUMINESCENT COMPOSITION IN AGRICULTURAL APPLICATIONS

(71) Applicant: Floratine Products Group, Inc, Collierville, TN (US)

(72) Inventors: Kevin Cavanaugh, Ponte Verda Beach, FL (US); Timothy B. Cartwright, Collierville, TN (US)

(73) Assignee: Floratine Products Group, Inc., Collierville, TN (US)

( * ) Notice: Subject to any disclaimer, the term of this patent is extended or adjusted under 35 U.S.C. 154(b) by 323 days.

(21) Appl. No.: 15/814,847

(22) Filed: Nov. 16, 2017

(65) Prior Publication Data

US 2018/0132471 A1 May 17, 2018

Related U.S. Application Data

(60) Provisional application No. 62/422,784, filed on Nov. 16, 2016.

(51) Int. Cl.

| | |
|---|---|
| ***A01G 7/00*** | (2006.01) |
| ***A01M 7/00*** | (2006.01) |
| ***A01G 20/00*** | (2018.01) |
| ***A01G 22/00*** | (2018.01) |
| ***C09K 11/02*** | (2006.01) |

(52) U.S. Cl.

CPC ........... *A01M 7/0092* (2013.01); *A01G 20/00* (2018.02); *A01G 22/00* (2018.02); *C09K 11/02* (2013.01)

(58) Field of Classification Search

CPC ....... A01M 7/0092; A01G 7/04; A01G 7/045; A01G 9/26; A01G 20/00; A01G 22/00

USPC ....................................... 47/1.5, 1.7, 58.1 LS

See application file for complete search history.

(56) References Cited

U.S. PATENT DOCUMENTS

| | | | | |
|---|---|---|---|---|
| 6,472,219 | B1 * | 10/2002 | Nieuwenhuis ........... | A01N 3/02 422/82.08 |
| 9,003,703 | B1 | 4/2015 | Cavanaugh et al. | |
| 9,038,552 | B1 | 5/2015 | Cavanaugh et al. | |
| 9,354,182 | B2 * | 5/2016 | Rochette ................ | G01N 21/94 |
| 9,637,869 | B1 * | 5/2017 | Hutcheson .............. | E01C 11/00 |
| 2006/0225344 | A1 * | 10/2006 | Van Der Krieken .. | B82Y 10/00 47/58.1 R |
| 2011/0297848 | A1 * | 12/2011 | Haidekker ............... | A01G 7/00 250/459.1 |
| 2012/0311744 | A1 * | 12/2012 | Sirkowski .............. | G01N 21/64 800/298 |

(Continued)

*Primary Examiner* — David J Parsley
*Assistant Examiner* — Danielle A Clerkley
(74) *Attorney, Agent, or Firm* — Susan B. Fentress; Veritay Group IP PLLC

(57) ABSTRACT

The inventive subject matter provides a method for the incorporation of colored photoluminescent materials to be sprayed on to plants and soils. The incorporation of colored photoluminescent materials assists the spray operator through the use of black lights allowing for more precise low light or nighttime spray and seeding operations. More specifically, this invention relates to a colored photoluminescent adjuvant to be applied to targeted crops, plants and seeds to assist in the low light or nighttime application of bioactive agents, such as chemicals and pesticides. The colored photoluminescent adjuvant can be applied as a solution or a foam.

6 Claims, 5 Drawing Sheets

(56) References Cited

U.S. PATENT DOCUMENTS

2015/0329505 A1* 11/2015 Tester ...................... C09D 5/22
47/1.5
2016/0247082 A1* 8/2016 Stehling ................. A01G 22/00

* cited by examiner

METHOD TO USE A COLORED PHOTOLUMINESCENT COMPOSITION IN AGRICULTURAL APPLICATIONS

CROSS-REFERENCE TO RELATED APPLICATIONS

This application claims the benefit of U.S. provisional patent application Nov. 16, 2016 Ser. No. 62/422,784 under 35 USC § 119(e). (hereby incorporated by reference).

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

STATEMENT REGARDING COLORED DRAWINGS

The patent or application file contains at least one drawing executed in color. Copies of this patent or patent application publication with color drawing(s) will be provided by the Office upon request and payment of the necessary fee.

BACKGROUND OF THE INVENTION

Field of the Invention

This invention is directed to use the use of colored photoluminescent composition to assist in turf management and agricultural applications. One technical need in this field is in the application process. The act of applying chemicals, pesticides, nutrients, biostimulants, water soluble watering agents and water to plants through spray applications is not new. Spraying materials by means of water or other liquid carriers in an aqueous solution for broadcast applications to plants and crops is known in the art.

Adjuvants are commonly used to improve the performance of a plant modulator performance. One classification of an adjuvant is a spray dye marker indicator which assists spray operations by visually notifying the operator by means of coloration or darkening of the intended or unintended target to the presence of an application of spray mixture. These spray dye marker indicators provide limited uses during spraying operations as they require daylight or artificial (non-backlight) light for visual verification of the spray mixture. Additionally, a number of different types of pesticides, nutrients, biostimulants, or water soluble watering agents can be applied at the same time. It is important to be able to track drift of any agents spayed in turf management and agricultural applications because of the negative consequence of drift. As many as 2.5 million acres of land were damaged in the past growing season due to pesticide drift. A need exists in the industry to be able to track agricultural chemicals particularly when planting genetically modified seeds.

BRIEF SUMMARY OF THE INVENTION

The inventive subject matter, in one embodiment, provides a method for the incorporation of colored photoluminescent materials to be sprayed on to plants and soils. The incorporation of colored photoluminescent materials assists the spray operator through the use of black lights allowing for more precise low light or nighttime spray and seeding operations. More specifically, this invention relates to a colored photoluminescent adjuvant to be applied to targeted crops, plants and seeds to assist in the low light or nighttime application of bioactive agents, such as chemicals and pesticides. The colored photoluminescent adjuvant can be applied as a solution or a foam.

This inventive subject matter includes: a method to use colored photoluminescent compositions in an agricultural or in a turf management application, including the steps of: applying a first colored photoluminescent adjuvant to a first target selected from the group consisting of: crops, plants and soil; applying a second photoluminescent adjuvant to a second target selected from the group consisting of: crops, plants and soil; detecting the location of the first photoluminescent adjuvant within 24 hours of application; and detecting the location of the second photoluminescent adjuvant within 24 hours of application. The method further includes the steps of: detecting the location of the first photoluminescent adjuvant within 24 hours of application; and detecting the location of the second photoluminescent adjuvant after 24 hours of application.

This invention is also directed to a method to use a photoluminescent composition to assist in turf management and agricultural applications. The novel subject matter includes: a method to track the placement of at least one active agent. The method includes the steps of: mixing a first colored photoluminescent adjuvant with a first active agent to form a first photoluminescent adjuvant; applying the first colored photoluminescent adjuvant to a target selected from the group consisting of: crops, plants and soil; illuminating the target during low light or nighttime spray operations with a black light to track the placement of the first active agent in the area. The method further includes the steps of: mixing a second colored photoluminescent adjuvant with a second active agent to form a second photoluminescent adjuvant; applying the second colored photoluminescent adjuvant to a target selected from the group consisting of: crops, plants and soil; illuminating the target during low light or nighttime spray operations with a black light to track in the placement of the second active agent within the area. The method further includes the steps of: mixing a third colored photoluminescent adjuvant with a third active agent to form a third photoluminescent adjuvant; applying the third colored photoluminescent adjuvant to a target selected from the group consisting of: crops, plants and soil; illuminating the target during low light or nighttime spray operations with a black light to track the placement of the third active agent within the area.

The inventive subject matter in one embodiment provides a method to map the placement of an active agent within an area, the steps including: applying a first colored photoluminescent adjuvant containing a first active agent to a target selected from the group consisting of: crops, plants and soil; and employing an unmanned aerial vehicle with a photoluminescence detector to map the placement of the first active agent within the area by detecting the location of the first colored photoluminescent adjuvant within the area. Additionally, this method includes the steps of: applying a second colored photoluminescent adjuvant containing a second active agent to a second target selected from the group consisting of: crops, plants and soil; and employing an unmanned aerial vehicle with a photoluminescence detector to map the placement of the second active agent within the area by detecting the location of the second colored photoluminescent adjuvant within the area. Additionally, this method includes the steps of: applying a third colored photoluminescent adjuvant containing a third active agent to a third target selected from the group consisting of: crops, plants and soil; and employing an unmanned aerial vehicle with a photoluminescence detector to map the placement of the third active agent within the area by detecting the location of the third colored photoluminescent adjuvant within the area.

DETAILED DESCRIPTION OF THE INVENTION

The present invention may be understood more readily by reference to the following detailed description of the invention. It is to be understood that this invention is not limited to the specific devices, methods, conditions or parameters described herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

These and other aspects, features and advantages of the invention will be understood with reference to the detailed description herein, and will be realized by means of the various elements and combinations particularly pointed out in the appended claims. It is to be understood that both the foregoing general description and the following detailed description of the invention are exemplary and explanatory of preferred embodiments of the invention and are not restrictive of the invention as claimed.

Figure 1A:
FIGS. 1A and 1B show a color photograph of plants under normal lighting conditions.
Figure 1B:

Now referring to FIGS. 1A and 1B photographs of plants sprayed with a non-toxic photoluminescent adjuvant under normal lighting conditions show healthy plants, but poor visibility.

Figure 2A:
FIGS. 2A and 2B show a color photograph of comparisons of a non-colored photoluminescent solution (left) with a colored a photoluminescent solution (right).
Figure 2B:

Now referring to FIGS. 2A and 2B, it can be seen that the colored photoluminescent adjuvant (right) provides much better illumination than the non-colored photoluminescent adjuvant (left). An adjuvant is a spray dye marker indicator which assists spray operations by visually notifying the operator by means of coloration or darkening of the intended or unintended target to the presence of an application of spray mixture. With this discovery, a method to use the colored photoluminescent adjuvant was developed.

The novel subject matter includes: a method to track the placement of at least one active agent. The method includes the steps of mixing a colored nontoxic photoluminescent adjuvant with at least one active agent to form a spray; applying the spray to targeted crops, plants and soil; providing a source of black light to illuminate the colored photoluminescent adjuvant and illuminating the targeted crops with black light during low-light or nighttime operations, to track the placement of the at least one active agent by illumination of the colored nontoxic photoluminescent adjuvant. In the preferred embodiment, a first color is applied to a first active agent, a second color is applied to a second active agent, and a third color is applied to a third active agent. The first, second, and third colored photoluminescent adjuvants can exist in the same or nearby fields, as multiple active agents are commonly applied to a crop in a field.

The crops and plants can include for example: turf grass, ornamental flowers, seeds, soils, shrubs and bushes. Spray operations are delivered to the foliar, crown and soil parts of a crop or plant. The spray operation can be: hand or knap-sack sprayer, boom, or aerial spraying such as by a crop duster. Significantly, this method allows for nighttime or low light applications by drones or crop dusters. A drone includes unmanned aerial vehicles. An example of a suitable drone is: DJI—Phantom 4 Pro Quadcopter—White Model: PHANTOM4 PRO (NA). Crop dusters include manned aerial vehicles.

Under ultraviolet light, the photoluminescent adjuvant allows the operator precise control of the spray mixture and nozzle performance across the boom which is better than in traditional daylight operations with spray dye indicators. The present invention relates to the controlled delivery of an active agent such as: chemicals, pesticides, nutrients, biostimulants, water solubles, wetting agents and water to plants, seeds and soils, with the incorporation of a colored photoluminescent adjuvant designed for assisting spray operations. The amount of the active agent ranged from 10% w/w to 25% w/w. However, the concentration of the active agent should be adjusted based on changes in efficacy related to the selected fluorescent dye. Examples of foliarly applied herbicides include: glyphosate and MSMA.

Photoluminescence is a process in which a substance absorbs photons (electromagnetic radiation) and then reradiates photons. There are two types of photoluminescence. Fluorescence is light energy produced by a process where high-energy radiation (such as ultraviolet or X-ray) is absorbed by electrons surrounding an atom and is re-emitted as light energy. Phosphorescence is light energy produced by a particular type of chemical reaction where the excess chemical energy of the reactants is given off as light energy.

The colored photoluminescent adjuvant is mixed with a liquid bioactive active agent, such as chemicals, pesticides, nutrients, biostimulants, water solubles, wetting agents and or water to plant parts or its soil. It is the unique nature of this formulation that allows for the absorption into plant tissues for its intended purpose(s). The colored photoluminescent adjuvant can be mixed with an active agent. The liquid based active agent can include: Dicamba, which is a white solid herbicide dissolved in a liquid carrier; a glyphosphate herbicide, such as ROUND-UP (Monsanto); or a MSMA herbicide.

It is the unique nature of this formulation that allows for the absorption into plant tissues for its intended purpose(s). The colored photoluminescent adjuvant can be mixed with compounds including nutrients such as—N, P, K, Ca, Mg, S, Fe, Mn, Cu, Zn, or B, preferably in the sulfate, nitrate, or phosphate forms.

In one embodiment, the colored photoluminescent adjuvant includes an optical brightener that may be made of cellulous or other nontoxic agents. One example of a nontoxic optical brightener is KEYFLUOR (Keystone Laboratories). The photoluminescent adjuvant is colored by adding a dye. A suitable dye is selected such that it is designed to be mixed with other chemical spray solutions (herbicides and pesticides) without decreasing the activity of the active agent; does not decrease or interfere with the photoluminescent activity; and if the colored photoluminescent adjuvant is to be applied to a dye the dye should be selected from dyes approved for use in cosmetics or foods. Some suitable examples of fluorescent dyes include: Rhodamine B, Brilliant Crocein MOO, and DYSOL Turquoise.

In one embodiment, the colored photoluminescent adjuvant is an organic dye solution produced at a concentration between 0.5% to 3.0% w/w and at least one adjuvant in the amount of 0.5% to 1.0% by weight of the formulation. Some suitable examples of fluorescent dyes include: Rhodamine B, Brilliant Crocein MOO, and DYSOL Turquoise. The adjuvants include: spreader-stickers, pH adjusters, stabilizers, antioxidants, and or wetting agents. The most common spray adjuvant is a non-ionic surfactant or a crop oil concentrate. Crop oil concentrates are a mixture of 80 to 85 percent nonphytotoxic petroleum-based oil plus 15 to 20 percent emulsifier (surfactant). The selection of the adjuvant is made base on the active agent to be delivered.

The selection of these adjuvants depends on the use of the spray and the quality of the mixing water. The dye solution from the above paragraph is then added to one or more of many active agents including fertilizers, insecticides, herbicides, secondary nutrients, and/or micronutrients. The weight percentage of the dye and adjuvants ranges from 0.5% to about 10% of the total formulation to be sprayed. Typically, the remainder is the active agent and water.

The colored photoluminescent adjuvant is mixed within a spray solution prior to application of the intended target. Through the use of photoluminescence the total adjuvant solution can be applied in low light or dark light conditions through the use of a mounted black light or lights ensuring precision spray to the targeted area. The spray patterns can also be detected during the day by using a UV spectrophotometer to measure color during the day.

The experimentation showed that a sufficient amount of the colored photoluminescent adjuvant to be detected was 0.2% w/w with a maximum of 0.4% w/w, depending on the opacity of the active agents.

This method can be used to track the placement of an active agent within an area. The area can be a field of crops or an area of turf such as a golf course or the area adjacent to the primary area to track for draft. This method can be used to 1) to map and track any drifting of the spray onto adjacent properties, 2) avoid skips of spray between passes which reduces yield and 3) avoid overlaps of spray which are costly and can be detrimental to the crops.

This method can be used to track storm water run-off and soil erosion patterns.

Typical spraying requirements include: the spray tips, line pressure and speed are adjusted to provide a total spray volume between 5 and 40 gallons per acre. The concentration of the spray is 0.2% w/w colored photoluminescent adjuvant with the total solution.

A test of the photoluminescent adjuvant was conducted at Spring Creek Ranch Golf Club in Collierville, Tenn. at approximately 8 pm. Utilizing a 200 gallon sprayer outfitted with TEEJET 8002 nozzles at 30 psi, one (1) gallon of the photoluminescent adjuvant was added to 100 gallons of water. The mixture was under constant mechanical agitation throughout the spraying operation. A source of photoexcitation, an ULTRAVIOLET-150 (150 Watt), an ultraviolet black light made by Altman Lighting Co. Inc., 57 Alexander Street, Yonkers, N.Y. 10701, was provided.

The spray operation was conducted on the 4$^{th}$ fairway. The Altman ULTRAVIOLET-150 is a compact, high-output black light, designed to provide high-intensity illumination of fluorescent materials at distances of up to 40 feet. The fixture is sealed and designed for wet locations and does not require any fans for cooling, resulting in extremely quiet operation. The electronic ballast was integrated into the housing. The unit was wired with 14/3 Hi-Temp rubber cable and was supplied with a clear safety lens. The sprayer was configured for normal operations with a ten (10') foot spray boom (length) and boom height of twenty (20") inches above ground level. An initial spray pass was made from a designated starting point to a fifty (50') foot stopping point under total darkness. The sprayer changed directions to line up with the left edge (west) of the initial pass in order to ensure proper spray coverage without overlap or skip of the mixture to the target. The ULTRAVIOLET-150 was turned on prior to the advancement of the sprayer in order to line up for the second pass. The initial pass was illuminated under the black light so much so that the second pass was easily lined up for and the second pass was accurately applied to the targeted area. Under UV light, the adjuvant allowed the operator precise control of the spray mixture and showed nozzle performance across the boom better than in traditional daylight operations with spray dye indicators.

Now referring to FIG. 1. Example 1-Trial 1: A 2% solution of photoluminescent adjuvant—White was produced in the lab and then placed in a hand-held pump sprayer at 0.2% concentration. Glyphosate was also added to the sprayer at the high label rate. This mixture was then misted on the foliage and the black light was turned on.

Figure 3A:
FIGS. 3A and 3B show a color photograph of comparisons of a non-colored photoluminescent solution (left) with a colored a photoluminescent solution (right).
Figure 3B:
Figure 4A:
FIGS. 4A and 4B show a color photograph of comparisons of a non-colored photoluminescent solution (left) with a colored a photoluminescent solution (right).
Figure 4B:

Now referring to FIGS. 2-4 photographs were taken at various distances between the UV light source and the plants. Trial 2: A 2% solution of "photoluminescent adjuvant—Red" was produced in the lab and then placed in a hand help pump sprayer at 0.2% concentration. Glyphosate was also added to the sprayer at the high label rate. One row of plants was then misted on the foliage. Then, 2% solutions of "photoluminescent adjuvant—White" was produced in the lab and then sprayed in a hand help pump sprayer at 0.2% concentration. Glyphosate was also then added to the sprayer at the high label rate. A second row of plants was then misted on the foliage and placed parallel to the Red spray and the black light was turned on. Photographs were taken at one distance between the UV light source and the plants. This was repeated with photoluminescent adjuvants—orange and yellow.

Figure 5:
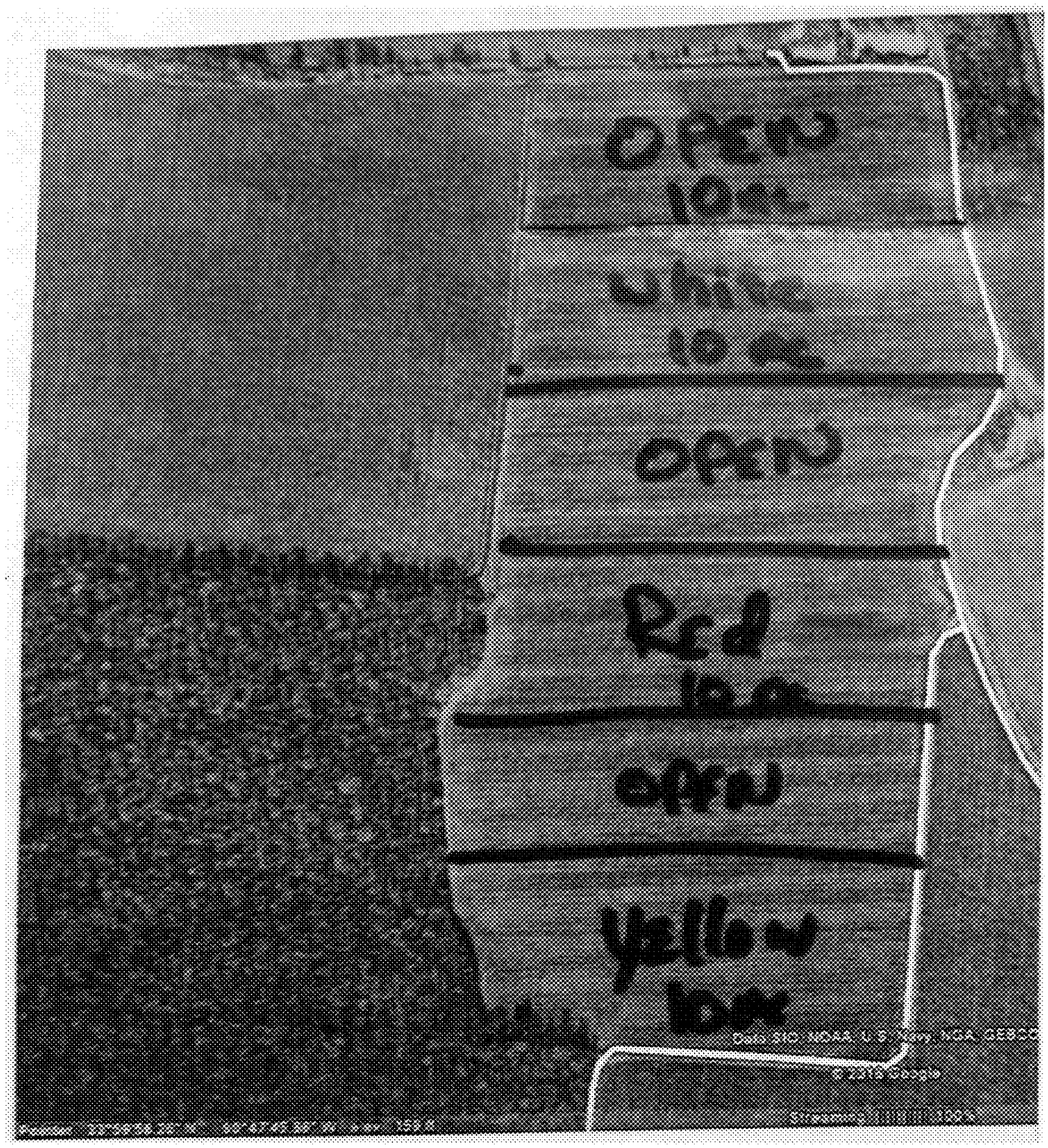
FIG. 5 shows a color photograph of the field layout for application of multi-colored nontoxic photoluminescent adjuvant to a field.

Now referring to FIG. 5 the field lay-out for application of multi-colored nontoxic photoluminescent to a field is shown. In this example, a nontoxic optical brightener such as KEYFLUOR (Keystone Laboratories) was mixed with the dyes: Yellow—Orcoacid Sulpho Phod B, Orange—Orcoacid Flour, Orange TF, and Red—Orcoacid Fourescine CRD, to prepare the colored photoluminescent adjuvant.

50 gallons of water and 2.5 gallons of colored photoluminescent adjuvant in a spray tank then pumped the mix into the crop duster. We marked off each area with a six-foot red flag at each color and marked the unsprayed areas to detect drift. All plots were 10 acres. The color pattern in the field was detected using a black light on top of an ATV. The user drove through the field to detect the color. It was easy to get the color on the camera as it looked like bluish white spots all over the leaves (even the bottom leaves). The colored photoluminescent adjuvant is detected within 24 hours of application to show the point of application and detected after 24 hours to show drift of the colored photoluminescent adjuvant.

The GPS coordinates of the ATV can be correlated with the color to render a pattern showing where the nontoxic photoluminescent adjuvant is applied and this process can be repeated later to show where the nontoxic photoluminescent adjuvant has drifted.

These and other aspects, features and advantages of the invention will be understood with reference to the detailed description herein, and will be realized by means of the various elements and combinations particularly pointed out in the appended claims. It is to be understood that both the foregoing general description and the following detailed description of the invention are exemplary and explanatory of preferred embodiments of the invention, and are not restrictive of the invention, as claimed.

We claim:

1. A method to map the placement of an active agent within an area comprising the steps of:

applying a first colored photoluminescent adjuvant containing a first active agent to a target selected from the group consisting of: crops, plants and soil; and employing an unmanned aerial vehicle with a photoluminescence detector to map the placement of the first active agent within the area by detecting the location of the first colored photoluminescent adjuvant within the area.

2. The method of claim 1 further comprising the step of: applying a second colored photoluminescent adjuvant containing a second active agent to a second target selected from the group consisting of: crops, plants and soil; and employing the unmanned aerial vehicle with a photoluminescence detector to map the placement of the second active agent within the area by detecting the location of the second colored photoluminescent adjuvant within the area.

3. The method of claim 2 further comprising the step of applying a third colored photoluminescent adjuvant containing a third active agent to a third target selected from the group consisting of: crops, plants and soil; and employing the unmanned aerial vehicle with a photoluminescence detector to map the placement of the third active agent within the area by detecting the location of the third colored photoluminescent adjuvant within the area.

4. The method of claim 3 further comprising the step of: illuminating the area during low light or nighttime with a black light.

5. The method of claim 2 further comprising the step of: illuminating the area during low light or nighttime with a black light.

6. The method of claim 1 further comprising the step of: illuminating the area during low light or nighttime with a black light.

* * * * *